United States Patent
Nomura et al.

(10) Patent No.: US 12,331,409 B2
(45) Date of Patent: Jun. 17, 2025

(54) FUEL CELL SEPARATOR MANUFACTURING METHOD

(71) Applicant: TOYOTA JIDOSHA KABUSHIKI KAISHA, Toyota (JP)

(72) Inventors: Yusuke Nomura, Toyota (JP); Hijiri Hirata, Toyota (JP); Tsuyoshi Seguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/406,980

(22) Filed: Jan. 8, 2024

(65) Prior Publication Data
US 2024/0301564 A1 Sep. 12, 2024

(30) Foreign Application Priority Data
Mar. 8, 2023 (JP) .................. 2023-035725

(51) Int. Cl.
*C23G 1/08* (2006.01)
*H01M 8/021* (2016.01)

(52) U.S. Cl.
CPC ............ *C23G 1/081* (2013.01); *H01M 8/021* (2013.01)

(58) Field of Classification Search
CPC .................. C23G 1/081; H01M 8/021; H01M 2008/1095; H01M 8/0228; Y02E 60/50; Y02P 70/50
See application file for complete search history.

(56) References Cited

U.S. PATENT DOCUMENTS

| | | | | |
|---|---|---|---|---|
| 6,884,363 B2 * | 4/2005 | Ohtani | ................... | C23G 1/086 216/13 |
| 9,531,014 B2 * | 12/2016 | Nagoshi | .................. | C22C 38/02 |
| 9,653,738 B2 * | 5/2017 | Ide | ............................. | C23C 8/80 |
| 9,680,162 B2 * | 6/2017 | Kaminaka | ............... | C22C 38/44 |
| 9,871,258 B2 * | 1/2018 | Nagoshi | .............. | H01M 8/0254 |
| 11,652,218 B2 * | 5/2023 | Aisaka | ................ | H01M 8/0206 429/513 |
| 2005/0089742 A1 * | 4/2005 | Ishigami | ............. | H01M 8/0228 29/825 |

(Continued)

FOREIGN PATENT DOCUMENTS

| | | | |
|---|---|---|---|
| JP | 2008027742 A | * | 2/2008 |
| JP | 2009-263794 A | | 11/2009 |

(Continued)

OTHER PUBLICATIONS

Doi et al., JP-2008027742-A, Machine Translation, Sep. 28, 2023. (Year: 2023).*

(Continued)

*Primary Examiner* — Joshua L Allen
*Assistant Examiner* — Christopher Remavege
(74) *Attorney, Agent, or Firm* — Finnegan, Henderson, Farabow, Garrett and Dunner, LLP

(57) ABSTRACT

The present disclosure relates to a fuel cell separator manufacturing method involving immersing a stainless-steel base material formed into a shape of a separator in an acidic solution having a fluorine ion concentration of 0.1 ppm or (Continued)

higher and a pH of 1±0.2 at 80° C.±5° C. for 60 minutes or longer to perform a modification treatment on a surface of the stainless-steel base material.

4 Claims, 4 Drawing Sheets

(56) References Cited

U.S. PATENT DOCUMENTS

| | | | |
|---|---|---|---|
| 2008/0057371 A1* | 3/2008 | Washima | H01M 8/0208 427/124 |
| 2008/0233456 A1 | 9/2008 | Ishikawa et al. | |
| 2009/0269649 A1 | 10/2009 | Jeon et al. | |
| 2012/0088184 A1* | 4/2012 | Nam | H01M 8/0228 429/514 |
| 2012/0276472 A1 | 11/2012 | Ide et al. | |
| 2013/0108945 A1 | 5/2013 | Ishii et al. | |
| 2013/0302718 A1* | 11/2013 | Ide | H01M 8/021 205/220 |
| 2014/0154129 A1* | 6/2014 | Makiishi | C21D 6/004 420/56 |
| 2014/0193668 A1 | 7/2014 | Makiishi et al. | |
| 2014/0272668 A1* | 9/2014 | Nagoshi | C21D 6/004 429/509 |
| 2018/0013153 A1* | 1/2018 | Kamepalli | H01M 8/0258 |
| 2018/0034069 A1* | 2/2018 | Tarutani | C23G 1/085 |
| 2020/0248332 A1 | 8/2020 | Yano et al. | |
| 2020/0340126 A1 | 10/2020 | Yano et al. | |
| 2022/0275491 A1* | 9/2022 | Choi | C22C 38/20 |

FOREIGN PATENT DOCUMENTS

| | | |
|---|---|---|
| JP | 2011-149041 A | 8/2011 |
| JP | 4811529 B2 | 11/2011 |
| JP | 5218612 B2 | 6/2013 |
| JP | 5434807 B2 | 3/2014 |
| JP | 5621186 B2 | 11/2014 |
| JP | 5972877 B2 | 8/2016 |
| JP | 6144006 B2 | 6/2017 |
| JP | 6418364 B1 | 11/2018 |
| JP | 6521203 B1 | 5/2019 |

OTHER PUBLICATIONS

Sugimoto Katsuhisa., "Passive Films on Stainless Steels-Present State of Analysis and Understanding," Zairyo-to-Kankyo 57 (2008), 375-384.

* cited by examiner

FUEL CELL SEPARATOR MANUFACTURING METHOD

CROSS-REFERENCE TO RELATED APPLICATION

This application claims priority to Japanese Patent Application No. 2023-035725 filed on Mar. 8, 2023, incorporated herein by reference in its entirety.

BACKGROUND

1. Technical Field

The present disclosure relates to a fuel cell separator manufacturing method and a fuel cell separator.

2. Description of Related Art

A solid polymer fuel cell (hereinafter written as "fuel cell") using an electrolyte membrane can operate at low temperatures and be made small and lightweight, and as such, its application to automobiles and the like is being explored.

In such a fuel cell, a plurality of cells (single cells) constituting a basic unit is stacked. Each cell includes a membrane-electrode assembly having a pair of gas diffusion layers (GDLs) disposed on both sides, and a pair of separators that sandwiches them. The membrane-electrode assembly has a structure in which an anode-side electrode and a cathode-side electrode are disposed on both sides of an electrolyte membrane that is an ion-exchange membrane.

As fuel cell separators, stainless-steel separators that are excellent in corrosion resistance and inexpensive are widely used. Stainless-steel separators secure their corrosion resistance by a passive film of chromium oxide (generally $Cr_2O_3$) and thus have low conductivity. Therefore, when using a stainless-steel base material for a fuel cell separator, it is necessary to improve its conductivity.

As a method of improving the conductivity of a stainless-steel base material, for example, a technique of subjecting a stainless-steel base material to a surface treatment such as plating with carbon or gold that has high conductivity is known. However, such a surface treatment incurs an additional cost and therefore is usually performed only on required minimum areas. For example, in some cases, a surface treatment is performed on only one surface of a power generation part (channel forming part) in a gas surface of anode-side and cathode-side separators, while in other cases, a surface treatment is performed on both surfaces of the power generation part (channel forming part) in the gas surface and a cooling surface thereof. In the former case, however, as stainless steel has low conductivity, the contact resistance on the cooling surface side becomes high, causing significant degradation of the power generation performance of the fuel cell, while in the latter case, although the power generation performance of the fuel cell is sufficient, an additional cost is unavoidable. Thus, when using a stainless-steel base material for a fuel cell separator, complicated processing for imparting sufficient conductivity required for a fuel cell member becomes necessary, as well as the problem of an additional cost arises.

To address these problems, methods other than a surface treatment have also been explored. For example, Japanese Unexamined Patent Application Publication No. 2008-27742 (JP 2008-27742 A) discloses a technique of recovering the conductivity of a separator by injecting a fuel cell with an acidic aqueous solution containing fluorine ions while in use. Specifically, J P 2008-27742 A discloses a method of recovering the conductive performance of a stainless-steel separator that has degraded as a solid polymer fuel cell including the stainless-steel separator has been used, and this method features performing a treatment of injecting the fuel cell with an acidic aqueous solution containing 0.001 mass % or more fluorine ions and having a pH of 1 to 5 so as to pass through the stainless-steel separator.

While the method disclosed in JP 2008-27742 A can recover the conductivity of the separator while the fuel cell is in use, it is also desirable to improve the conductivity of the stainless-steel base material before use of the fuel cell.

SUMMARY

As described above, conventional manufacturing of fuel cell separators made of stainless steel is faced with the problem of an additional cost, and there has been a need for a separator that has high conductivity at an initial stage of operation of a fuel cell. Therefore, the present disclosure aims to provide a manufacturing method of a fuel cell separator having high conductivity at an initial stage of operation of a fuel cell by which conductivity can be imparted to a stainless-steel base material at a low cost.

The present inventors found that treating a stainless-steel base material formed into a shape of a separator with an acidic solution under predetermined conditions could impart conductivity to the stainless-steel base material at a low cost, with an obtained separator having high conductivity at an initial stage of operation of a fuel cell, and thus completed the present disclosure.

The gist of the present disclosure is as follows.

(1) A fuel cell separator manufacturing method involving immersing a stainless-steel base material formed into a shape of a separator in an acidic solution having a fluorine ion concentration of 0.1 ppm or higher and a pH of 1±0.2 at 80° C.±5° C. for 60 minutes or longer to perform a modification treatment on a surface of the stainless-steel base material.

(2) The fuel cell separator manufacturing method described in (1), wherein the acidic solution is sulfuric acid or hydrochloric acid having a fluorine ion concentration of 0.1 ppm to 5 ppm.

(3) The fuel cell separator manufacturing method described in (1) or (2), wherein, in a passive film on a surface of the stainless-steel base material of the fuel cell separator, a ratio of a Cr content (atomic %) to an Fe content (atomic %) (Cr/Fe ratio) obtained by X-ray photoelectron spectroscopy (XPS) exceeds 1, with that before the modification treatment being 1;
a ratio of an Mn content (atomic %) to the Fe content (atomic %) (Mn/Fe ratio) obtained by XPS exceeds 1, with that before the modification treatment being 1, and
a ratio of a total content (atomic %) of Cr and Mn to the Fe content (atomic %) ((Cr+Mn)/Fe ratio) obtained by XPS exceeds 1, with that before the modification treatment being 1.

The present disclosure can provide a manufacturing method of a fuel cell separator having high conductivity at an initial stage of operation of a fuel cell by which conductivity can be imparted to a stainless-steel base material at a low cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
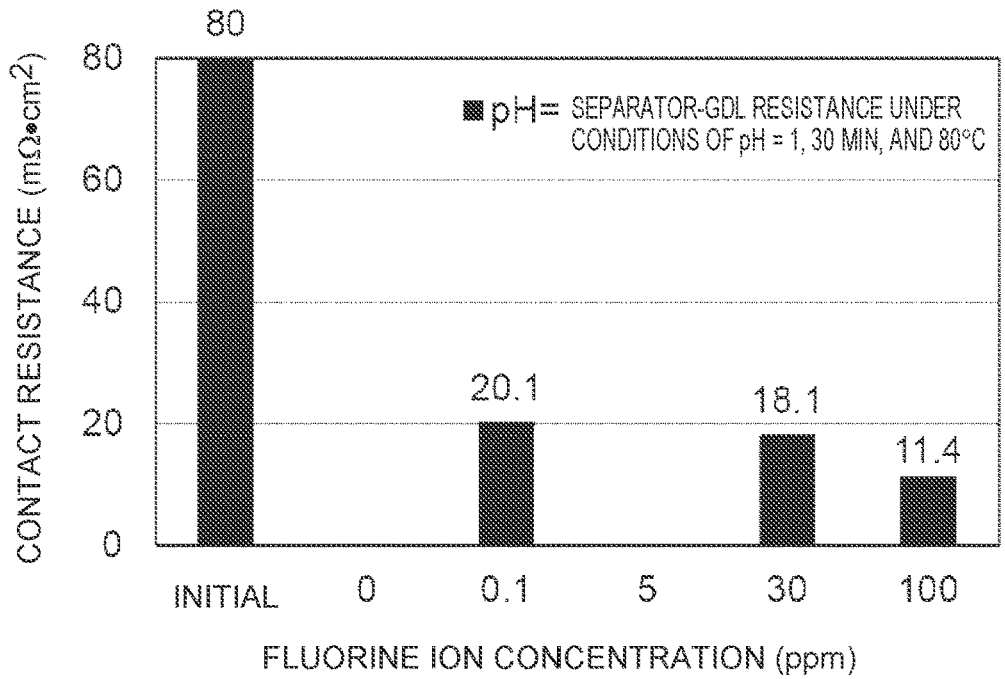
FIG. 1A is a graph showing contact resistance (to a GDL) relative to a fluorine ion concentration for a treatment time of 30 minutes.

A preferred embodiment of the present disclosure will be described in detail below.

The present disclosure relates to a method of manufacturing a stainless-steel fuel cell separator from a stainless-steel base material. The fuel cell separator manufacturing method of the present disclosure involves immersing a stainless-steel base material formed into a shape of a separator in an acidic solution containing fluorine ions at a predetermined concentration to perform a modification treatment on a surface of the stainless-steel base material.

The stainless steel of the stainless-steel base material is not particularly limited, and austenitic stainless steel such as SUS304, SUS316, and SUS430 and ferritic stainless steel such as SUS444 as specified in JIS G 4305: 2015 can be named as examples. Among them, SUS304 is preferable from the viewpoint of corrosion resistance and processability.

The thickness of the stainless-steel base material is not particularly limited, and it is normally 80 μm to 200 μm and preferably 80 μm to 100 μm.

In the present disclosure, the stainless-steel base material formed into a shape of a separator is immersed in an acidic solution to perform a modification treatment on the surface of the stainless-steel base material. Formation of the stainless-steel base material into a shape of a separator can be performed by, for example, press forming. The shape of a separator may be any shape of an ordinary fuel cell separator, and is, for example, a shape in which a large number of grooves are formed as depressions and ridges along a longitudinal direction so as to form channels for a fuel gas, an oxidant gas, and a refrigerant. However, the shape of the separator is not limited to this shape as long as these channels can be secured.

In the present disclosure, the stainless-steel base material formed into a shape of a separator is immersed in an acidic solution containing fluorine ions at a predetermined concentration (hereinafter also written as "acid pickling treatment") to perform a modification treatment on the surface of the stainless-steel base material. This acid pickling treatment (modification treatment) can enhance the conductivity of the stainless-steel base material.

While the acidic solution is not particularly limited and, for example, sulfuric acid, hydrochloric acid, nitric acid, hydrofluoric acid, acetic acid, and carbonic acid are conceivable, an acidic solution that destroys an initial passive film and reduces the amount of Fe in the film such that the amount of Cr increases relatively is desirable. From the viewpoint of a contact resistance reducing effect, sulfuric acid and hydrochloric acid are preferable as the acidic solution, and from experimental data, sulfuric acid is more preferable.

When applying the method of the present disclosure to a gas surface side of a fuel cell separator in one embodiment, it is preferable that sulfuric acid or hydrochloric acid be used as the acidic solution. When sulfuric acid or hydrochloric acid is used as the acidic solution, the contact resistance of the fuel cell separator to a GDL can be reduced to 12 mΩ·cm$^2$ or lower that is a preferable range for this embodiment.

When applying the method of the present disclosure to a cooling surface side of a fuel cell separator in one embodiment, it is preferable that sulfuric acid be used as the acidic solution. When sulfuric acid is used as the acidic solution, the contact resistance of the fuel cell separator to a separator can be reduced to 2 mΩ·cm$^2$ or lower that is a preferable range for this embodiment.

The acidic solution contains 0.1 ppm or more fluorine ions (fluoride ions, F$^-$). When the acidic solution contains fluorine ions, the conductivity of the stainless-steel base material can be significantly enhanced. The upper limit of the fluorine ion concentration in the acidic solution is, for example, 1000 ppm or lower, and from the viewpoint of cost reduction, it is preferably 100 ppm or lower, more preferably 30 ppm or lower, particularly preferably 5 ppm or lower, and most preferably 1 ppm or lower. From the viewpoint of achieving both high conductivity and a low cost of the separator, the fluorine ion concentration in the acidic solution is preferably 0.1 ppm to 100 ppm, more preferably 0.1 ppm to 30 ppm, particularly preferably 0.1 ppm to 5 ppm, and most preferably 0.1 ppm to 1 ppm. When applying the method of the present disclosure to the gas surface side of a fuel cell separator in one embodiment, setting the fluorine ion concentration in the acidic solution to 30 ppm or higher can further enhance the conductivity of the stainless-steel base material. In the present disclosure, ppm means mass ppm.

An acidic solution containing fluorine ions at a predetermined concentration can be obtained by adding fluoride to an acidic solution so as to achieve a target fluorine ion concentration. The amount of fluoride to be added to the acidic solution can be adjusted as appropriate according to the target fluorine ion concentration. Fluoride is not particularly limited, and lithium fluoride, sodium fluoride, potassium fluoride, rubidium fluoride, and cesium fluoride can be named as examples. Among them, sodium fluoride (NaF) that is inexpensive and generally easy to handle is preferable.

The pH of the acidic solution used for the acid pickling treatment is 1±0.2. When the pH of the acidic solution is within this range, it is possible to enhance the conductivity of the stainless-steel base material while reducing the amount of fluorine to be added to the acidic solution, so that the conductivity of the stainless-steel base material can be increased at a low cost. The pH of the acidic solution can be adjusted to a target value through adjustment of the amount to be added of the acidic solution to be used and the amount of fluoride (preferably NaF) to be added.

In the present disclosure, the stainless-steel base material is immersed in an acidic solution containing fluorine ions at a predetermined concentration at 80° C.±5° C. for 60 minutes or longer.

The temperature of the immersion treatment is 80° C.±5° C., preferably 80° C.±2.5° C., and more preferably 80° C. When the temperature of the immersion treatment is set to 80° C.±5° C. from the viewpoint of the temperature rising time and the case of managing the temperature inside a furnace, it is possible to enhance the conductivity of the stainless-steel base material while reducing the amount of fluorine to be added to the acidic solution, so that the conductivity of the stainless-steel base material can be enhanced at a low cost. The temperature of the immersion treatment refers to the actual temperature of the stainless-steel base material in a state of being immersed in the acidic solution.

The time of the immersion treatment is 60 minutes or longer, preferably 60 minutes to 300 minutes, more preferably 60 minutes to 150 minutes, and particularly preferably 60 minutes to 90 minutes in consideration of temperature rising and falling times and a stable soaking time that affect productivity. In the present disclosure, when the treatment conditions are set as described above, the conductivity of the stainless-steel base material can be enhanced by a short-time acid pickling treatment, and thus the conductivity of the stainless-steel base material can be enhanced at a low cost. The time of the immersion treatment can be adjusted as appropriate according to target conductivity.

In the present disclosure, as the modification treatment is performed on the surface of the stainless-steel base material by the acid pickling treatment, the passive film having been formed on the surface of the stainless-steel base material before the modification treatment is temporarily destroyed and Fe in the film is melted and reduced, so that a new film having high conductivity with the amounts of Cr and Mn relatively increased is formed, which seems to improve the conductivity of the stainless-steel base material. While the mechanism is not known, according to a literature (written by Katsuhisa Sugimoto, Zairyo-to-Kankyo, vol. 57, p. 375 to 384 (2008)), when a film undergoes a change in composition, it assumes a semiconductor property. Thus, it is presumed that semiconductor oxide, for example, $Cr_xO_y$, (where $0<x<2$, $0<y<3$) is formed on the surface of the base material.

The fuel cell separator manufacturing method of the present disclosure may include, after the above-described acid pickling treatment step, a water washing treatment step of washing the stainless-steel base material having undergone the acid pickling treatment with water. The water washing treatment can be performed by a commonly used method, and removes the acidic solution that has adhered during the acid pickling treatment from the stainless-steel base material using water such as tap water or industrial water.

The fuel cell separator manufacturing method of the present disclosure may include, after the above-described water washing treatment step, a drying treatment step of drying the stainless-steel base material that has been washed with water. The drying treatment can be performed under such conditions that moisture on the surface of the stainless-steel base material is sufficiently removed, and is normally performed under the conditions of a temperature of room temperature to 50° C. and a time of one minute to one hour.

The fuel cell separator manufacturing method of the present disclosure may include, after the above-described drying treatment step, a step of performing a carbon surface treatment on the obtained fuel cell separator by physical vapor deposition (PVD), chemical vapor deposition (CVD), etc. according to desired conductivity.

The present disclosure also relates to a fuel cell separator that is obtained by the above-described manufacturing method. Thus, the fuel cell separator of the present disclosure is obtained by the method involving immersing a stainless-steel base material formed into a shape of a separator in an acidic solution having a fluorine ion concentration of 0.1 ppm or higher and a pH of 1±0.2 at 80° C.±5° C. for 60 minutes or longer to perform a modification treatment on the surface of the stainless-steel base material.

The fuel cell separator of the present disclosure is formed by a stainless-steel base material. The stainless-steel base material of the fuel cell separator is as described earlier in connection with the fuel cell separator manufacturing method. The term "stainless-steel base material" used in relation to the fuel cell separator refers to a stainless-steel base material that has been subjected to a modification treatment by the acid pickling treatment of the present disclosure.

In the fuel cell separator of the present disclosure, as the modification treatment is performed by the above-described acid pickling treatment, the passive film on the surface of the stainless-steel base material is modified. Specifically, the above-described acid pickling treatment changes the passive film on the surface of the stainless-steel base material from a passive film rich in Fe to a high-conductivity passive film rich in Cr and Mn.

In the fuel cell separator of the present disclosure, an element composition obtained by X-ray photoelectron spectroscopy (XPS) on the surface of the stainless-steel base material is controlled to be within a certain atomic ratio range so as to achieve high conductivity. In the present disclosure, "the surface of the stainless-steel base material" refers to a part from an outermost surface of the stainless-steel base material to a depth of less than 10 nm. Thus, in the present disclosure, "the surface of the stainless-steel base material" corresponds to the passive film on the surface of the stainless-steel base material.

The XPS analysis can be conducted using an XPS device (e.g., PHI 5000 VersaProbe II manufactured by ULVAC) under the following conditions. X-ray source: AlKa monochromatic light, output 25 W, voltage 15 kV, irradiation range: ϕ100 μm, analysis range: 1000×200 μm, neutralizing gun: on, pulse energy (wide: 187.85 cV, narrow: 46.95-117.40 cV), step width (wide: 0.4 cV, narrow: 0.1 eV), shift correction C1s: C-C, C-H, 284.8 eV. A depth analysis can be conducted while etching with Ar monomer under the conditions of a voltage of 3 kV, an irradiation area of 2×2 mm, and an etching speed of 9.3 nm/min. From the resulting data, the atomic ratio is obtained using data (atomic %) of Cr2p3, Mn2p3, and Fe2p3.

In the fuel cell separator of the present disclosure, a ratio of a Cr content (atomic %) to an Fe content (atomic %) (Cr/Fe ratio) in the passive film on the surface of the stainless-steel base material obtained by the XPS analysis exceeds 1, with that before the modification treatment being 1, i.e., the Cr content increases relative to the Fe content compared with that before the modification treatment.

In the fuel cell separator of the present disclosure, a ratio of an Mn content (atomic %) to the Fe content (atomic %) (Mn/Fe ratio) in the passive film on the surface of the stainless-steel base material obtained by the XPS analysis exceeds 1, with that before the modification treatment being 1, i.e., the Mn content increases relative to the Fe content compared with that before the modification treatment.

In the fuel cell separator of the present disclosure, a ratio of a total content (atomic %) of Cr and Mn to the Fe content (atomic %) ((Cr+Mn)/Fe ratio) in the passive film on the surface of the stainless-steel base material obtained by the XPS analysis exceeds 1, with that before the modification treatment being 1, i.e., the total content of Cr and Mn increases relative to the Fe content compared with that before the modification treatment.

In the fuel cell separator of the present disclosure, the Cr content in the passive film on the surface of the stainless-steel base material obtained by the XPS analysis exceeds 1, with that before the modification treatment being 1.

In the fuel cell separator of the present disclosure, the Mn content in the passive film on the surface of the stainless-steel base material obtained by the XPS analysis exceeds 1, with that before the modification treatment being 1.

In the fuel cell separator of the present disclosure, the Fe content in the passive film on the surface of the stainless-steel base material obtained by the XPS analysis is lower than 1, with that before the modification treatment being 1.

In the fuel cell separator of the present disclosure, it is preferable that in a profile (an axis of ordinate) of the XPS analysis (narrow analysis), count numbers (intensities) of Cr oxide and Mn oxide be located higher, while Fe oxide is located lower, than before the modification treatment, which means Fe has decreased while Cr and Mn have increased compared with those before the modification treatment.

The fuel cell separator of the present disclosure has high conductivity. The fuel cell separator of the present disclosure preferably has contact resistance to a GDL (separator-GDL contact resistance) of 12 mΩ·cm² or lower. Further, the fuel cell separator of the present disclosure preferably has contact resistance to a separator (separator-separator contact resistance) of 2 mΩ·cm² or lower.

In the following, the present disclosure will be further specifically described using examples of implementation. However, the technical scope of the present disclosure is not limited to these examples of implementation.

Study on Acid Pickling Treatment Conditions

NaF was added to a sulfuric acid solution such that the fluorine ion concentration in the solution reached a predetermined value to prepare a sulfuric acid solution containing fluorine ions at a predetermined concentration and having a pH of 1. In this fluorine ion-containing sulfuric acid solution, SUS304 formed into a shape of a fuel cell separator (a SUS304 separator) was immersed at 80° C. for 30 minutes or 60 minutes. After immersion, the SUS304 separator taken out of the sulfuric acid solution was washed with water and let dry naturally before the contact resistance was measured.

Measurement of Separator-GDL Contact Resistance

The SUS304 separator was cut into a 5 cm by 6 cm piece to prepare a measurement sample. As a material corresponding to a gas diffusion layer (GDL), a carbon paper was prepared and cut into a 40 cm by 50 cm piece. The carbon paper and the measurement sample were placed one on top of the other and sandwiched by an Au-plated conductive jig of a measurement device. Then, a load of 1 MPa was applied, and a reading ten seconds after a current of 1 A was passed was measured.

Measurement of Separator-Separator Contact Resistance

The SUS304 separator was cut into a 5 cm by 6 cm piece to prepare a measurement sample. Two measurement samples were placed one on top of the other and sandwiched by the Au-plated conductive jig of the measurement device. Then, a load of 1 MPa was applied, and a reading ten seconds after a current of 1 A was passed was measured.

Figure 1B:
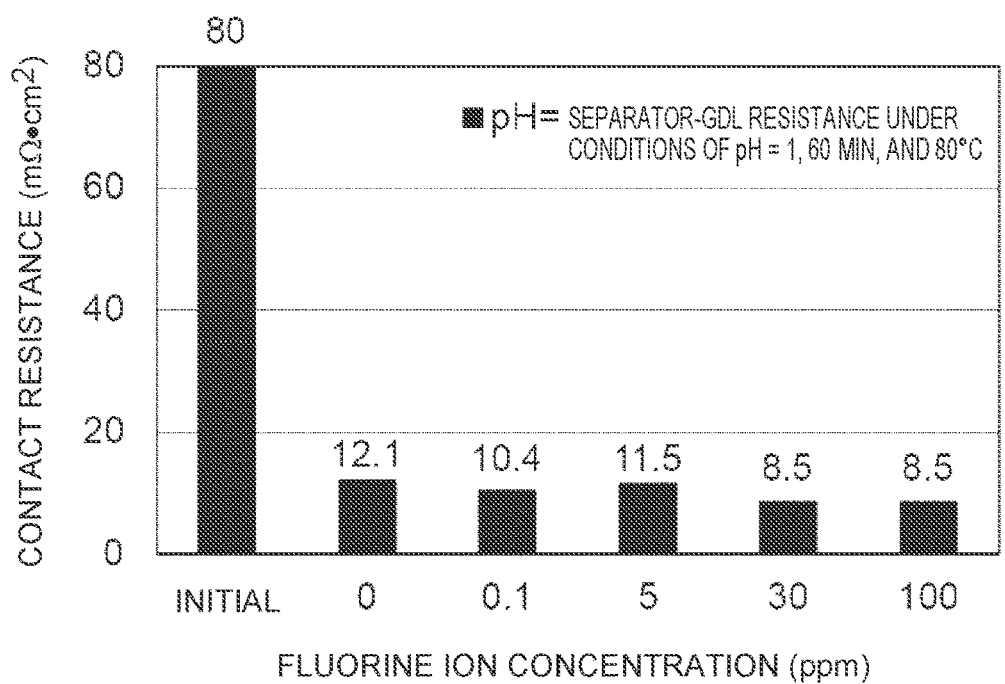
FIG. 1B is a graph showing contact resistance (to the GDL) relative to the fluorine ion concentration for a treatment time of 60 minutes.
Figure 2A:
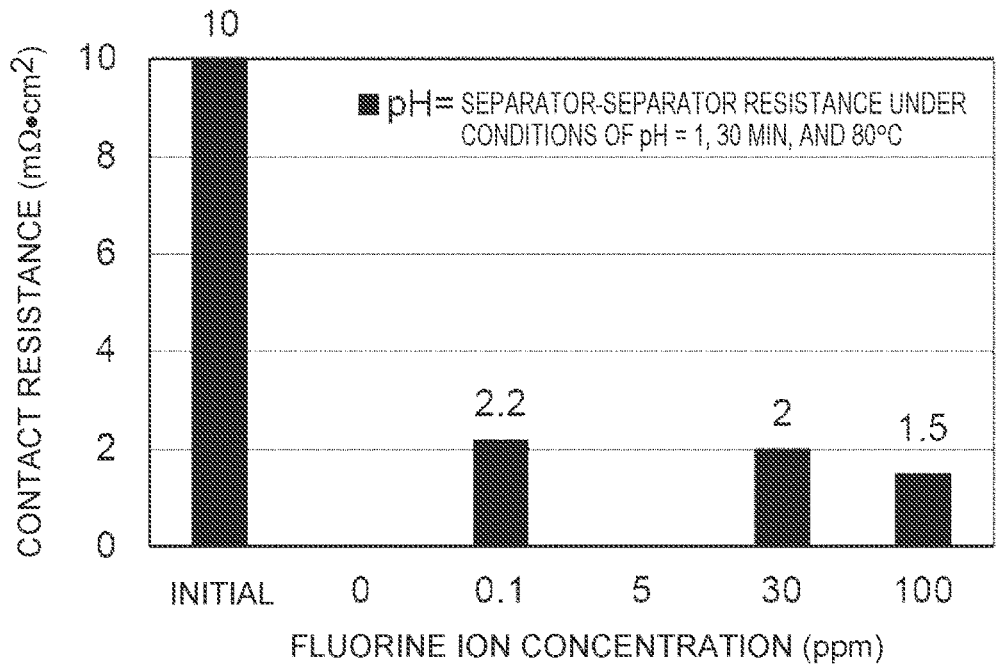
FIG. 2A is a graph showing contact resistance (to a separator) relative to the fluorine ion concentration for a treatment time of 30 minutes.
Figure 2B:
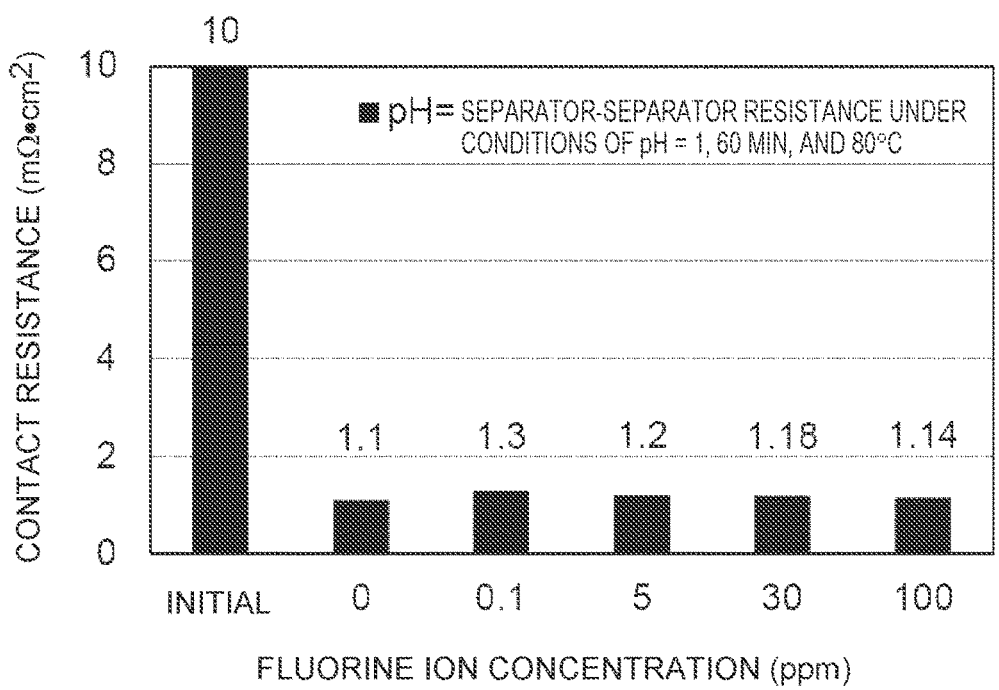
FIG. 2B is a graph showing contact resistance (to the separator) relative to the fluorine ion concentration for a treatment time of 60 minutes.

FIG. 1A shows the contact resistance (to the GDL) relative to the fluorine ion concentration for a treatment time of 30 minutes. FIG. 1B shows the contact resistance (to the GDL) relative to the fluorine ion concentration for a treatment time of 60 minutes. FIG. 2A shows the contact resistance (to the separator) relative to the fluorine ion concentration for a treatment time of 30 minutes. FIG. 2B shows the contact resistance (to the separator) relative to the fluorine ion concentration for a treatment time of 60 minutes.

As shown in FIG. 1A and FIG. 1B, when the SUS304 separator was treated with a sulfuric acid solution or a fluorine ion-containing sulfuric acid solution, the contact resistance thereof (to the GDL) decreased substantially compared with that before immersion in the sulfuric acid solution (indicated by "INITIAL" in the drawings). Here, it is generally preferable that the contact resistance to the GDL on the gas surface side of the fuel cell separator be 12 mΩ·cm² or lower. As shown in FIG. 1A, when the treatment time was 30 minutes, this target contact resistance value was achieved at a fluorine ion concentration of 100 ppm or higher. By contrast, as shown in FIG. 1B, when the treatment time was 60 minutes, this target contact resistance value was achieved at a fluorine ion concentration of 0.1 ppm or higher. Thus, under the treatment conditions of pH being 1, 80° C., and 60 minutes, it was possible to enhance the conductivity of the separator while reducing the amount of fluorine to be added to the sulfuric acid solution.

As shown in FIG. 2A and FIG. 2B, when the SUS304 separator was treated with a sulfuric acid solution or a fluorine ion-containing sulfuric acid solution, the contact resistance thereof (to the separator) decreased substantially compared with that before immersion in the sulfuric acid solution (indicated by "INITIAL" in the drawings). Here, it is generally preferable that the contact resistance to the separator on the cooling surface side of be the fuel cell separator be 2 mΩ·cm² or lower. As shown in FIG. 2A, when the treatment time was 30 minutes, this target contact resistance value was achieved at a fluorine ion concentration of 30 ppm or higher. By contrast, as shown in FIG. 2B, when the treatment time was 60 minutes, this target contact resistance value was achieved at a fluorine ion concentration of 0.1 ppm or higher. Thus, under the treatment conditions of pH being 1, 80° C., and 60 minutes, it was possible to enhance the conductivity while reducing the amount of fluorine to be added to the sulfuric acid solution.

Study on Type of Acidic Solution

A reducing effect on the contact resistance of the separator was confirmed using sulfuric acid, hydrochloric acid, and nitric acid as the acidic solution. As a sample for a sulfuric acid treatment, the sample obtained for the above-described study on the acid pickling treatment conditions was used. Samples for a hydrochloric acid treatment or a nitric acid treatment were obtained in the same manner as in the above-described study on the acid pickling treatment conditions except that sulfuric acid was changed to hydrochloric acid or nitric acid. The acid pickling treatment conditions were the pH being 1, the fluorine ion concentration being 0 ppm or 5 ppm, 80° C., and 60 minutes. The contact resistance of the SUS304 separator (to the GDL and to the separator) after the acid pickling treatment was measured.

Figure 3A:
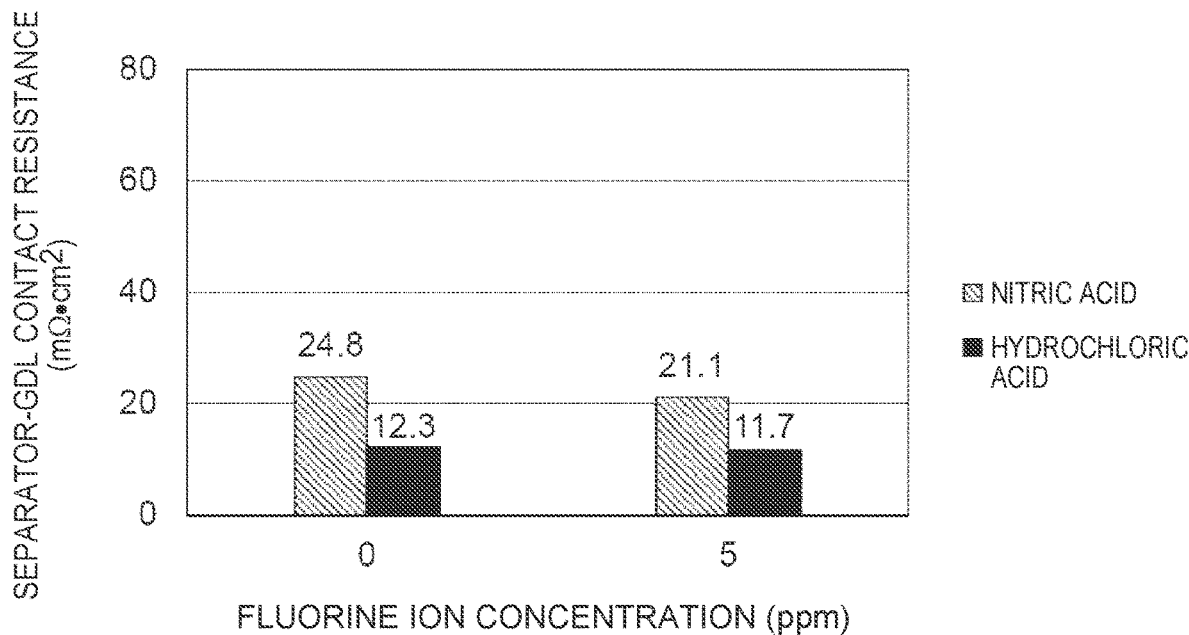
FIG. 3A is a graph showing contact resistance (to the GDL) relative to the fluorine ion concentration for a hydrochloric acid treatment and a nitric acid treatment.
Figure 3B:
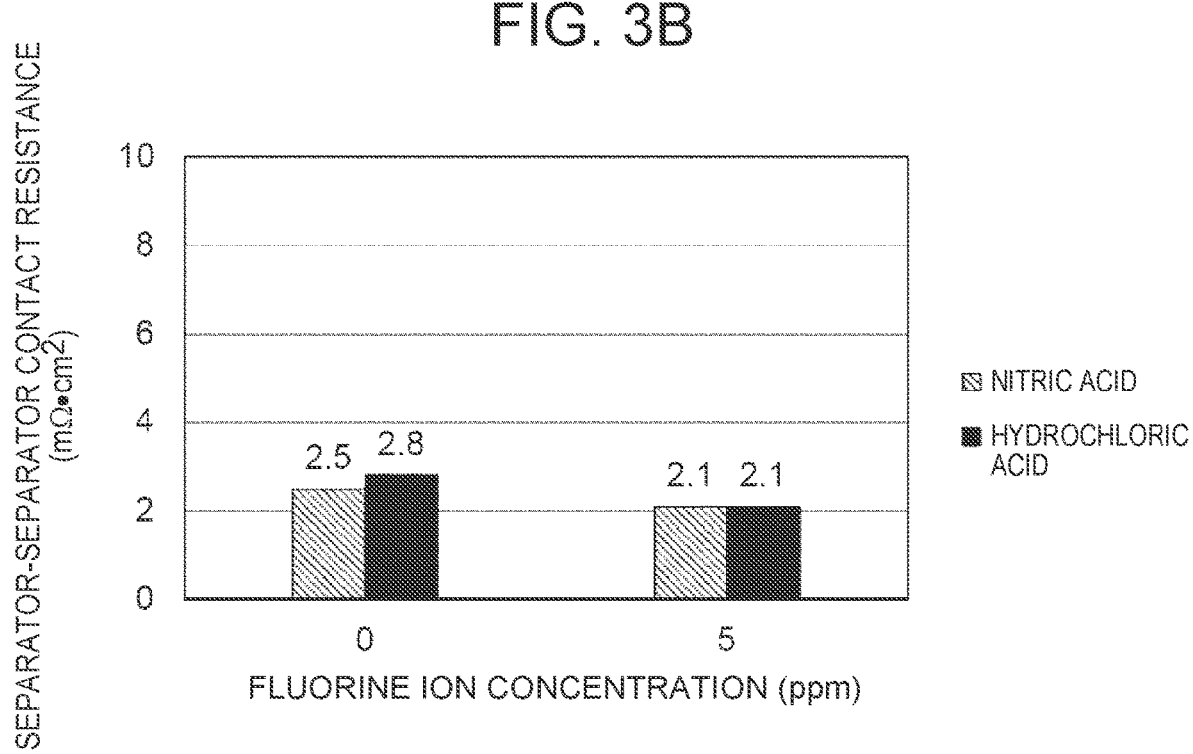
FIG. 3B is a graph showing contact resistance (to the separator) relative to the fluorine ion concentration for the hydrochloric acid treatment and the nitric acid treatment.

FIG. 3A shows the contact resistance (to the GDL) relative to the fluorine ion concentration for the hydrochloric acid treatment and the nitric acid treatment. FIG. 3B shows the contact resistance (to the separator) relative to the fluorine ion concentration for the hydrochloric acid treatment and the nitric acid treatment.

As shown in FIG. 1B and FIG. 3A, in each of the cases where the acidic solution was sulfuric acid, hydrochloric acid, and nitric acid, the separator-GDL contact resistance decreased compared with that before the treatment. Here, the contact resistance reducing effect was higher with sulfuric acid and hydrochloric acid than with nitric acid. Further, as shown in FIG. 2B and FIG. 3B, in each of the cases where the acidic solution was sulfuric acid, hydrochloric acid, and nitric acid, the separator-separator contact resistance decreased compared with that before the treatment. Here, the contact resistance reducing effect was higher with sulfuric acid than with hydrochloric acid and nitric acid.

XPS Surface Element Analysis

The element composition in the passive film on the surface of the SUS304 separator having been treated under the acid pickling treatment conditions of the present disclosure was measured by X-ray photoelectron spectroscopy (XPS). The acid pickling treatment was performed as described earlier in connection with the study on the acid pickling treatment conditions. The acid pickling treatment conditions were the pH being 1, the fluorine ion concentration being 100 ppm, 80° C., and 60 minutes. The XPS analysis was conducted using an XPS device (PHI 5000 VersaProbe II manufactured by ULVAC) under the following conditions. X-ray source: AlKa monochromatic light, output 25 W, voltage 15 kV, irradiation range: ϕ100 μm, analysis range: 1000×200 μm, neutralizing gun: on, pulse energy (wide: 187.85 eV, narrow: 46.95-117.40 eV), step width (wide: 0.4 eV, narrow: 0.1 eV), shift correction C1s: C-C, C-H, 284.8 eV. A depth analysis was conducted while etching with Ar monomer under the conditions of a voltage of 3 kV, an irradiation area of 2×2 mm, and an etching speed of 9.3 nm/min.

Figure 4A:
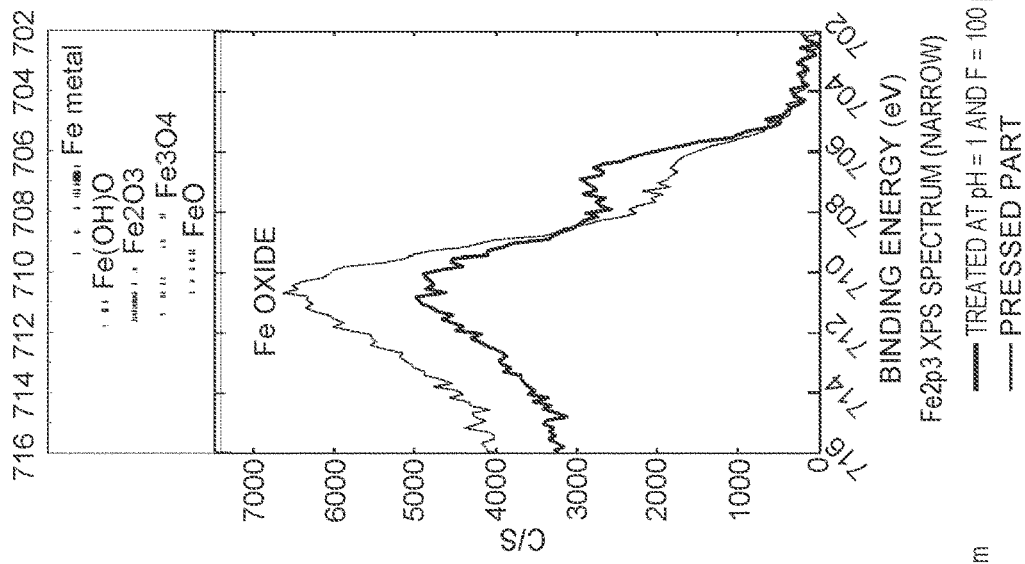
FIG. 4A is a graph showing an XPS spectrum of Cr oxide.
Figure 4B:
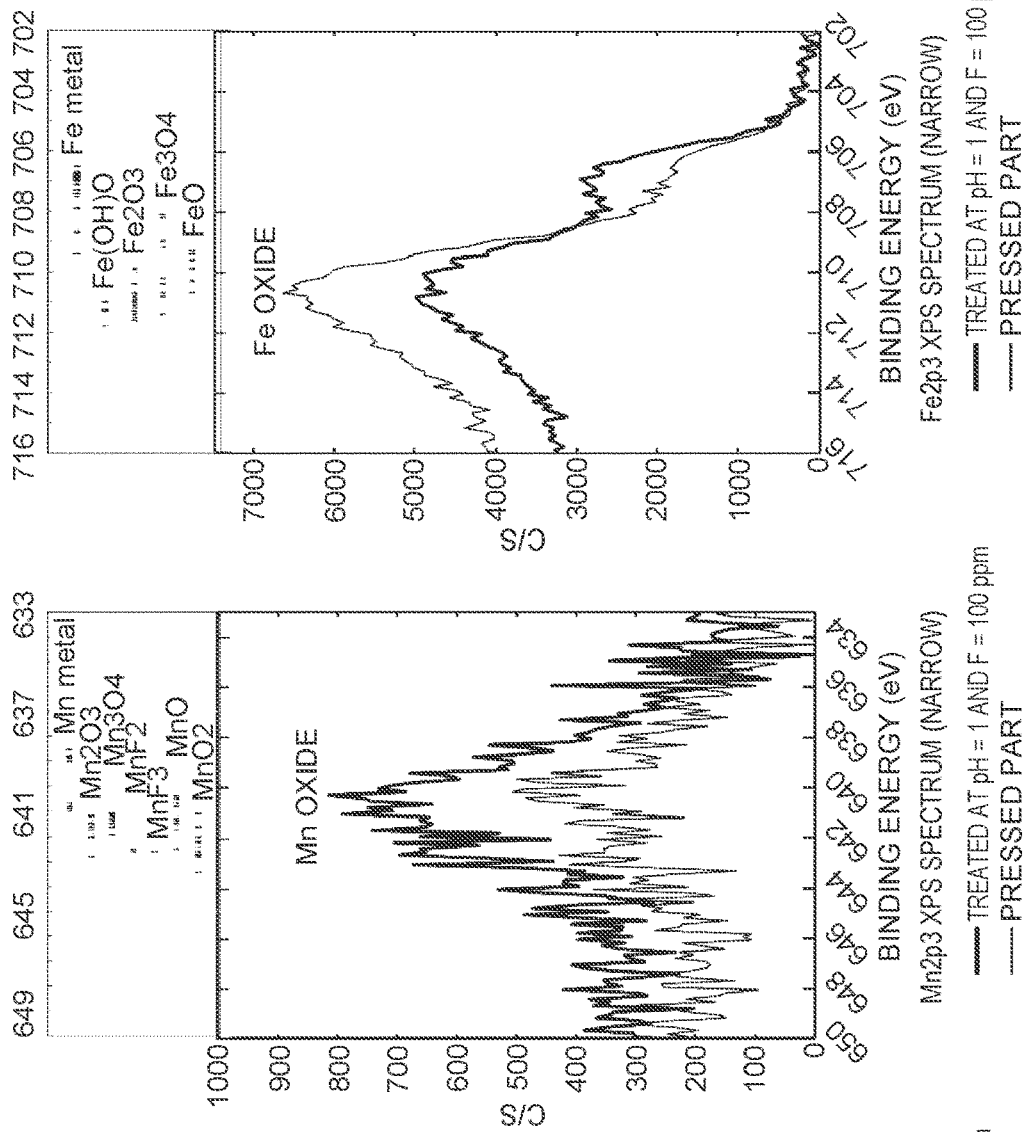
FIG. 4B is a graph showing an XPS spectrum of Mn oxide.
Figure 4C:
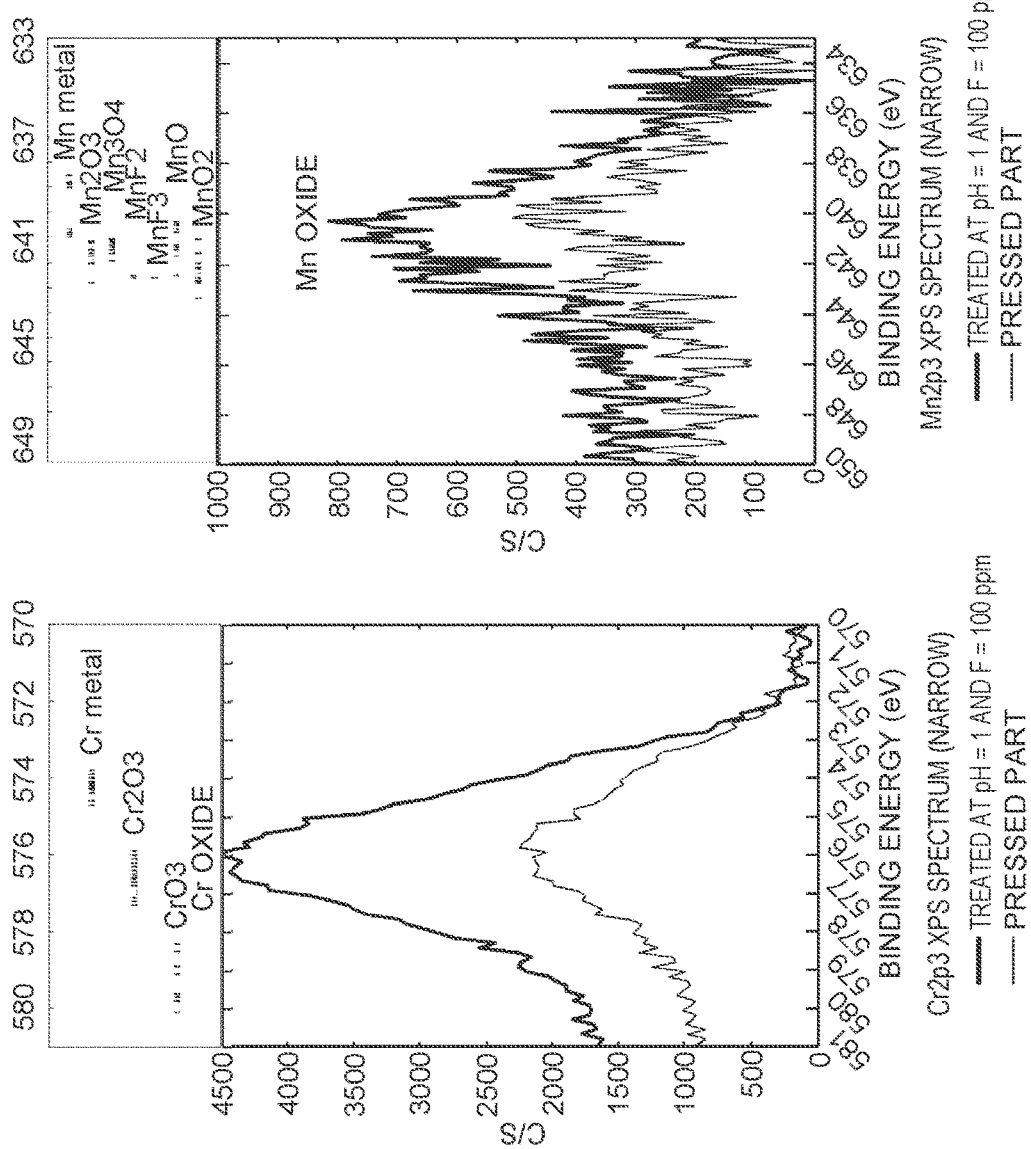
FIG. 4C is a graph showing an XPS spectrum of Fe oxide.

Table 1 and FIG. 4A to FIG. 4C show the result of the XPS surface element analysis. FIG. 4A shows an XPS spectrum of Cr oxide. FIG. 4B shows an XPS spectrum of Mn oxide. FIG. 4C shows an XPS spectrum of Fe oxide. In Table 1 and FIG. 4A to FIG. 4C, "pressed part" is a SUS304 separator that has not undergone the modification treatment.

TABLE 1

| | atomic % | | | | | | |
|---|---|---|---|---|---|---|---|
| Sample Name | C1s | N1s | O1s | F1s | Cr2p3 | Mn2p3 | Fe2p3 |
| Treated at pH = 1 and F = 100 ppm | 52 | 3.7 | 31 | ND | 6.9 | 1.1 | 5.7 |
| Pressed part | 53 | 2.4 | 33 | ND | 3.5 | 0.8 | 7.3 |

As shown in Table 1 and FIG. 4A to FIG. 4C, the passive film on the surface of the SUS304 separator that had not undergone the modification treatment was a passive film rich in Fe. By contrast, the passive film on the surface of the SUS304 separator that had been treated under the acid pickling treatment conditions of the present disclosure was a passive film rich in Cr and Mn.

What is claimed is:

1. A fuel cell separator manufacturing method involving immersing a stainless-steel base material formed into a shape of a separator in an acidic solution having a fluorine ion concentration of 0.1 ppm to 5 ppm and a pH of 1±0.2 at 80° C.±5° C. for 60 minutes for 60 minutes to 300 minutes to perform a modification treatment on a surface of the stainless-steel base material.

2. The fuel cell separator manufacturing method according to claim 1, wherein the acidic solution is sulfuric acid or hydrochloric acid having a fluorine ion concentration of 0.1 ppm to 5 ppm.

3. The fuel cell separator manufacturing method according to claim 1, wherein, in a passive film on a surface of the stainless-steel base material of the fuel cell separator, a ratio of a Cr content (atomic %) to an Fe content (atomic %) (Cr/Fe ratio) obtained by X-ray photoelectron spectroscopy (XPS) exceeds 1, with that before the modification treatment being 1;

a ratio of an Mn content (atomic %) to the Fe content (atomic %) (Mn/Fe ratio) obtained by XPS exceeds 1, with that before the modification treatment being 1, and a ratio of a total content (atomic %) of Cr and Mn to the Fe content (atomic %) ((Cr+Mn)/Fe ratio) obtained by XPS exceeds 1, with that before the modification treatment being 1.

4. The fuel cell separator manufacturing method according to claim 1, wherein the acidic solution has a fluorine ion concentration of 0.1 ppm to 1 ppm.

* * * * *